(12) United States Patent
Cui et al.

(10) Patent No.: US 11,462,987 B2
(45) Date of Patent: Oct. 4, 2022

(54) VIBRATION MOTOR

(71) Applicant: AAC Technologies Pte. Ltd., Singapore (SG)

(72) Inventors: Zhiyong Cui, Shenzhen (CN); Yun Tang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 463 days.

(21) Appl. No.: 16/706,849

(22) Filed: Dec. 9, 2019

(65) Prior Publication Data

US 2020/0212785 A1 Jul. 2, 2020

(30) Foreign Application Priority Data

Dec. 29, 2018 (CN) .......................... 201822268307.6

(51) Int. Cl.
*H02K 33/16* (2006.01)
*H02K 33/18* (2006.01)
*H02K 33/02* (2006.01)
*B06B 1/04* (2006.01)

(52) U.S. Cl.
CPC ............. *H02K 33/18* (2013.01); *H02K 33/02* (2013.01); *H02K 33/16* (2013.01); *B06B 1/045* (2013.01)

(58) Field of Classification Search
CPC ..................... H02K 33/00–35/06; B06B 1/045
See application file for complete search history.

(56) References Cited

FOREIGN PATENT DOCUMENTS

KR 20130111778 A * 10/2013

\* cited by examiner

*Primary Examiner* — Ramon M Barrera
(74) *Attorney, Agent, or Firm* — W&G Law Group

(57) ABSTRACT

An embodiment of the present invention provides a vibration motor. The vibration motor includes a vibrating component movable along a vibration direction; a fixation component including a housing with an accommodation space; an elastic support part suspending the vibrating component in the accommodation space; and a number of limit blocks fixedly connected with the housing. Each of the limit blocks includes a first horizontal part and a second horizontal part. The second horizontal part extends from the first horizontal part towards the housing along the vibration direction. The vibration motor provided by the present invention can effectively solve the problem that the vibration motor loses function because of the collision between the vibrating component and the housing

6 Claims, 4 Drawing Sheets

VIBRATION MOTOR

FIELD OF THE PRESENT DISCLOSURE

The present invention relates to the technical field of electromagnetic motion parts, particularly to a vibration motor.

DESCRIPTION OF RELATED ART

The vibration motor is a component which uses the generation principle of electromagnetic force to convert electric energy into mechanical energy. The vibration motor is often arranged in the portable telephone and other electronic products to generate silent feedback signals.

When working, the vibration motor needs to ensure enough driving force, however, over-high driving force causes the excessive amplitude of the vibrating component. When the amplitude of the vibrating component is greater than the maximum vibrating space of the vibration motor, the vibrating component collides the housing, which makes the vibration motor lose function by impact and generate noises.

In addition, an over-big torque is applied to the limit block when the limit block is collided by the weight in the vibration motor of relevant technologies, and then the cover is deformed, and the limit block is easy to disconnect.

Thus, it is necessary to provide an improved vibration motor to solve the problems above.

SUMMARY OF THE PRESENT INVENTION

One of the primary objects of the present invention is to
In order to achieve the object mentioned above, an exemplary embodiment of the present invention provides

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiments described hereby is only to explain the disclosure, not intended to limit the disclosure.

Figure 1:
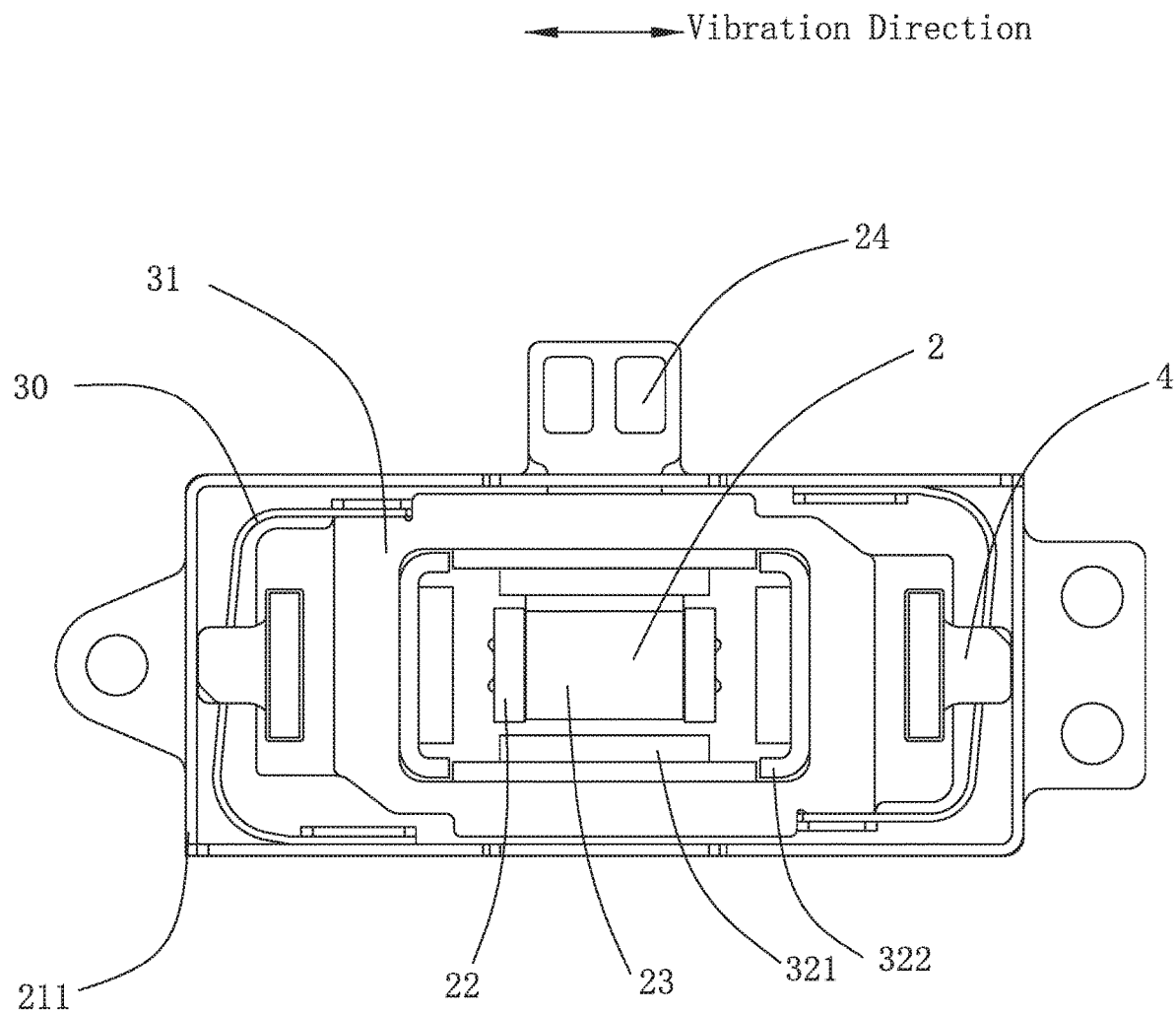
FIG. 1 is a top view of a vibration motor in accordance with an exemplary embodiment of the present invention.
Figure 2:
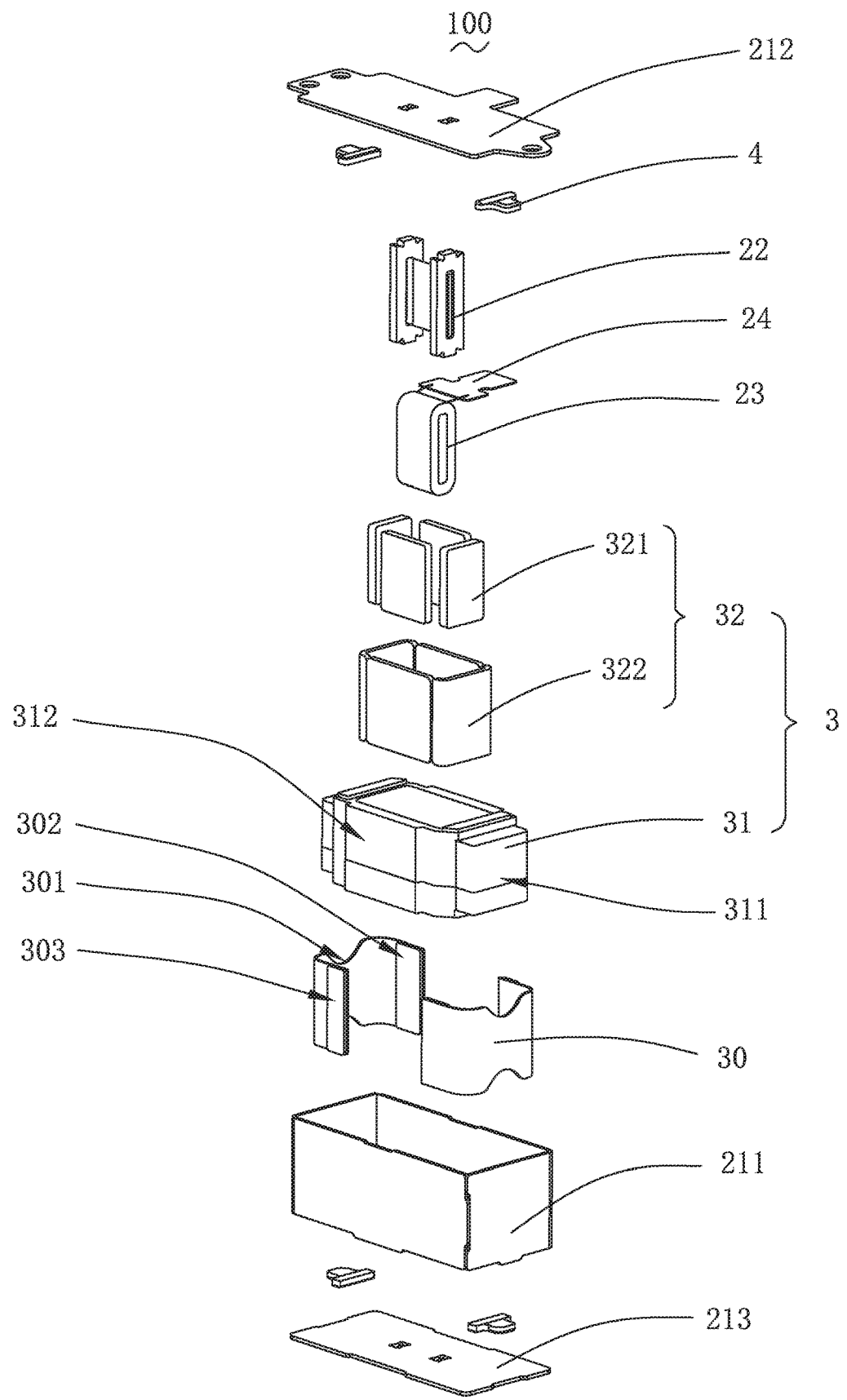
FIG. 2 is an exploded view of the vibration motor in FIG. 1.

Please refer to FIGS. 1-2, the present invention provides a vibration motor 100. The vibration motor 100 comprises an elastic support part 30, a fixation component 2 and a vibrating component 3, wherein, the fixation component 2 comprises a housing 21 with an accommodation space, and the elastic support part 30 suspends and supports the vibrating component 3 in the accommodation space.

In the embodiment, the housing 21 comprises a frame 211 and an upper cover body 212 and a lower cover body 213 which are arranged at and cooperate with the two opposite ends of the frame 211 to form the accommodation space. The description is that the upper cover body 212 and the lower cover body 213 are only used for identifying the two cover bodies but not fixedly indicating any cover body.

The fixation part 2 further comprises a coil support 22 fixedly arranged on the upper cover body 212, a coil 23 fixedly arranged on the support 22, and a flexible circuit board 24 electrically connected with the coil 23, wherein, the coil 23 is disposed opposite to and spaced from a magnet assembly 32. In the embodiment, the housing 21, the coil support 22, the coil 23 and the flexible circuit board 24 form the fixation component 2 of the vibration motor 100. Of course, the composition of the fixation component is not limited by the components above. Any component whose position is fixed in the vibration motor 100 can be called as a fixation component.

Figure 3:
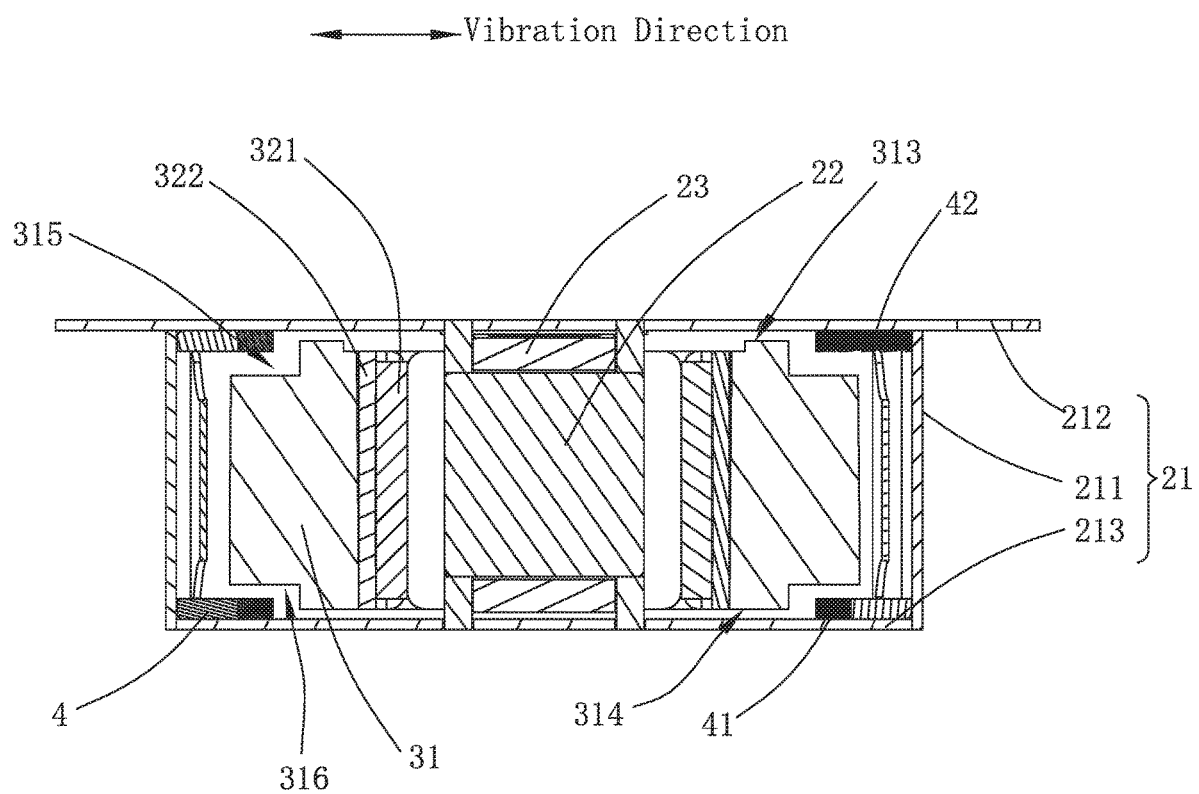
FIG. 3 is a cross-sectional view of the vibration motor.

Please refer to FIGS. 2-3, the vibrating component 3 comprises a weight 31 provided with an accommodation hole in a middle thereof. The vibrating component 3 further comprises the magnet assembly 32 arranged in the accommodation hole at the middle of the weight 31. The magnet assembly 32 comprises a magnet 321 and a magnetic yoke 322 fixed between the magnet 321 and the weight 31. In the embodiment, the weight 31 and the magnet assembly 32 form the vibrating component 3 of the vibration motor 100. Of course, the composition of the vibrating component is not limited by the components above. In the vibration motor 100, any component that driven by the electromagnetic induction force between the coil 23 and the magnet assembly 32 to carry out reciprocating motion in the accommodation space of the housing can be called as a vibrating component.

In addition, the weight 31 and the elastic support part 30 are fixedly connected. The weight 31 is rectangular, and comprises a first side wall 311 perpendicular to the long axis direction, a second side wall 312 perpendicular to the short axis direction and a first end surface 313 and a second end surface 314 which are parallel to the vibrating direction and oppositely arranged. The weight 31 further comprises a first avoiding part 315 and a second avoiding part 316, wherein, the first avoiding part 315 is concave towards the second end surface 314 along the first side wall 311 from the first end surface 313, and the second avoiding part 316 is concave towards the first end surface 313 along the first side wall 311 from the second end surface 314.

The vibration motor 100 further comprises a plurality of limit blocks 4. The limit blocks 4 are arranged between the vibrating component 3 and the housing 21 to prevent the direct contact between the vibrating component 3 and the housing 21. In addition, the positions of the elastic support part 30 corresponding to the limit blocks 4 are provided with gaps 301 for avoiding the limit blocks 4.

In the embodiment, two pairs of limit blocks 4 are arranged in total, and respectively fixed on the upper cover body 212 and the lower cover body 213. The limit blocks 4 are fixed to the upper cover body 212 and the lower cover body 213 by welding. Of course, as an alternative, the limit blocks 4 can be arranged in the vibrating direction of the vibrating component 3, and fixedly held to the vibrating component 3. As an alternative, the limit blocks 4 can be arranged in the vibrating direction of the vibrating component 3, and fixedly held to the elastic connection part 30.

Specifically, each limit block 4 is in a T shape, and comprises a first horizontal part 41 and a second horizontal part 42, wherein, the first horizontal part 41 is arranged far away from the housing 21, and the second horizontal part 42 is formed towards the housing 21 from the middle of the first horizontal part 41. Preferably, the first horizontal part 41 is arranged along the direction perpendicular to the vibrating direction of the vibration motor. Preferably, the first horizontal part 41 and the second horizontal part 42 can be separately made and then fixedly connected or the first horizontal part 42 and the second horizontal part 41 can be molded in one body.

Specifically, the first horizontal part 41 is arranged along the second side wall 312 and at the position of the limit block 4 corresponding to the first avoiding part 315 and the second avoiding part 316. One end of the second horizontal part 42 is connected with the first horizontal part 41, and the other end butts the frame 211.

Figure 4:
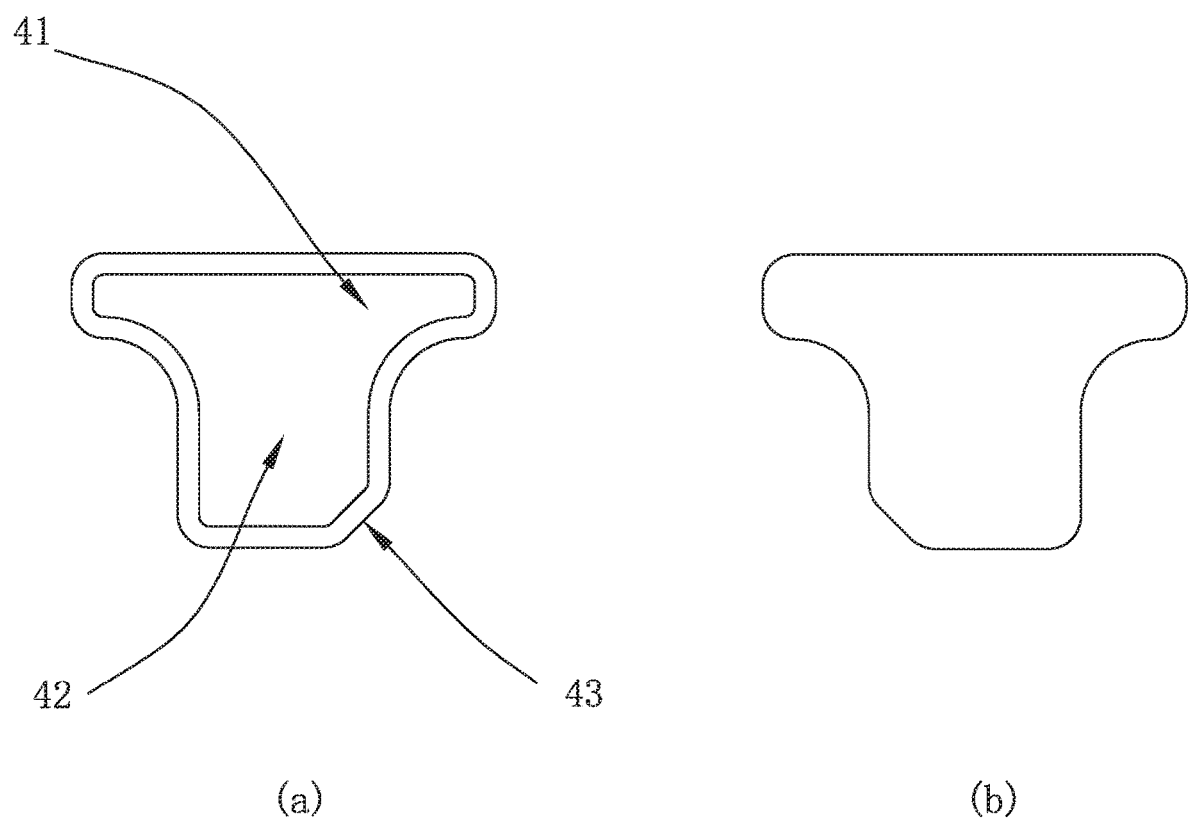
FIG. 4 is a top and bottom view of a limit block of the vibration motor of the exemplary embodiment.

Please refer to FIGS. 3-4, the second horizontal part 41 comprises a corner missing part 43. The corner missing part 43 is arranged at the end of the second horizontal part 42 far away from the first horizontal part 41. The elastic support part 30 comprises a first fixation part 302 connected with the housing 21, and a second fixation part 303 connected with the weight 31. The corner missing part 43 is arranged at the side of the second horizontal part 42 close to the second fixation part 303. The structure is convenient for identifying the front surface of the limit block 4 before welding and for welding the front surface of the limit block 4 with the upper cover body 212 or the lower cover body 213 so as to prevent the wrong match of the front surface (FIG. 4-*a*) or the back surface (FIG. 4-*b*) when the limit block 4 and the housing 21 are assembled.

Compared with relevant technologies, the vibration motor provided by the present invention can effectively solve the problem that the vibration motor loses function because of the collision between the vibrating component and the housing. In addition, the limit block is made into a T shape, which provides a large contact area between the limit block and the bottom plate and then enlarges the welding area between the limit block and the housing. The end of the second horizontal part of the T-shaped limit block far away from the first horizontal part butts the housing to make the housing bear some impact, which reduces the risk of housing deformation and limit block disconnection. At last, the second horizontal part of the T-shaped limit block is designed for preventing wrong match, and the front surface and the back surface of the limit block can be identified when assembling.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
 a vibrating component movable along a vibration direction;
 a fixation component including a housing with an accommodation space;
 an elastic support part suspending the vibrating component in the accommodation space and;
 a plurality of limit blocks fixedly connected with the housing, each limit block comprising a first horizontal part and a second horizontal part;
 wherein the second horizontal part extends from the first horizontal part towards the housing along the vibration direction;
 the vibrating component comprises a weight fixedly connected with the elastic support part; the weight comprises a first side wall perpendicular to a long axis direction, and a second side wall perpendicular to a short axis direction; and the first horizontal part is arranged perpendicular to the second side wall;
 the weight comprises a first end surface and a second end surface opposite to the first end surface; both of the first and second end surfaces are parallel to the vibrating direction; the weight further comprises a first avoiding part and a second avoiding part; the first avoiding part is concave towards the second end surface along the first side wall from the first end surface, and the second avoiding part is concave towards the first end surface along the first side wall from the second end surface.

2. The vibration motor as described in claim 1, wherein each limit block is fixed to the housing by welding, and arranged at a position corresponding to the first avoiding part and the second avoiding part.

3. The vibration motor as described in claim 1, wherein one end of the second horizontal part is connected with the first horizontal part, and the other end abuts against the housing.

4. The vibration motor as described in claim 1, wherein the second horizontal part comprises a corner missing part arranged at an end of the second horizontal part far away from the first horizontal part.

5. The vibration motor as described in claim 4, wherein the elastic support part comprises a first fixation part connected with the housing, and a second fixation part connected with the weight; the corner missing part is arranged at a side of the second horizontal part close to the second fixation part.

6. The vibration motor as described in claim 1, wherein positions of the elastic support part corresponding to the limit blocks includes a plurality of gaps for avoiding the limit blocks.

\* \* \* \* \*